United States Patent [19]
Sims et al.

[11] Patent Number: 5,524,845
[45] Date of Patent: Jun. 11, 1996

[54] AUTOMATIC TARGET RECOGNITION SYSTEM

[75] Inventors: S. Richard F. Sims; Thomas W. Branch, both of Huntsville; Jonathan A. Mills, Toney, all of Ala.

[73] Assignee: The United States of America as represented by the Secretary of the Army, Washington, D.C.

[21] Appl. No.: 386,998

[22] Filed: Feb. 6, 1995

[51] Int. Cl.⁶ .................................................. F41G 7/26
[52] U.S. Cl. .................................... 244/3.17; 244/3.16
[58] Field of Search ................................ 244/3.17, 3.16; 342/64, 189

[56] References Cited

U.S. PATENT DOCUMENTS

| | | | |
|---|---|---|---|
| 3,680,105 | 7/1972 | Goldstone | 342/196 X |
| 3,748,644 | 7/1973 | Tisdale | 244/3.17 X |
| 4,881,270 | 11/1989 | Knecht et al. | 382/17 |
| 4,895,431 | 1/1990 | Tsujiuchi et al. | 350/320 |
| 5,029,220 | 7/1991 | Juday | 382/6 |
| 5,083,571 | 1/1992 | Prichep | 128/731 |
| 5,341,142 | 8/1994 | Reis et al. | 342/64 |
| 5,422,828 | 6/1995 | Choate et al. | 364/516 |
| 5,430,445 | 7/1995 | Peregrim et al. | 392/25 |

*Primary Examiner*—Michael J. Carone
*Assistant Examiner*—Christopher K. Montgomery
*Attorney, Agent, or Firm*—Anthony Lane; Fred M. Bush; Hay Kyung Chang

[57] ABSTRACT

A potential target scenery image data is filtered and complex-multiplied with synthetic discriminant functions to produce a two-dimensional, cross-correlated surface. The surface is then analyzed to determine the spatial coordinates of the target, if any.

3 Claims, 1 Drawing Sheet

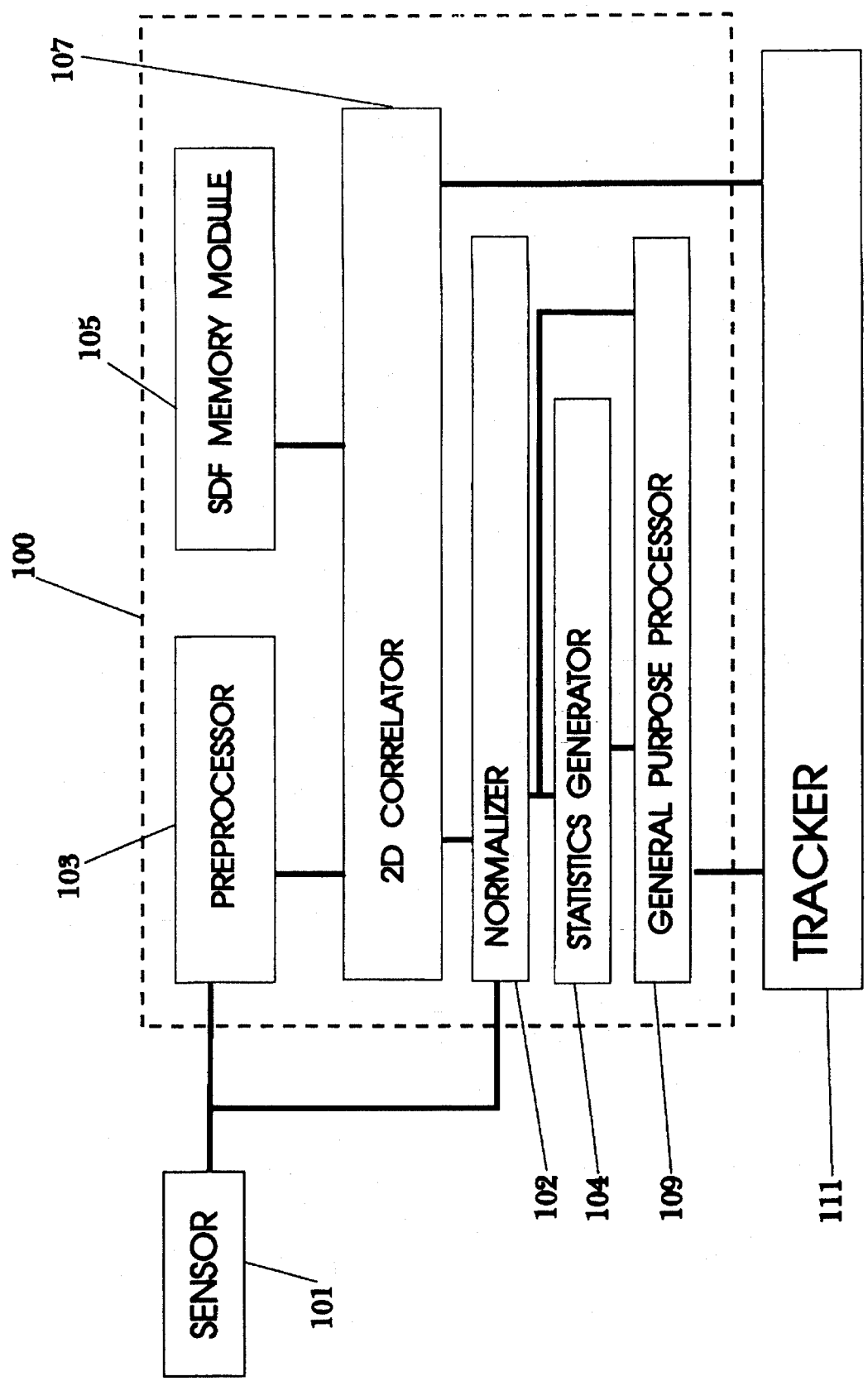

AUTOMATIC TARGET RECOGNITION SYSTEM

DEDICATORY CLAUSE

The invention described herein may be manufactured, used and licensed by or for the Government for governmental purposes without the payment to us of any royalties thereon.

BACKGROUND OF THE INVENTION

The current state of the art in autonomous target acquisition guided weapons, which include submunitions and precision-guided long range missiles, relies on a lock-on-before-launch (LOBL) approach and is limited to target detection and that reliable only in relatively short range applications. No fielded technology exists for long range precision-guided missiles that provides an automated capability to perform the detection, recognition and identification of targets from a missile seeker during flight.

SUMMARY OF INVENTION

The Automatic Target Recognition System is implemented by complex-multiplying prestored or downloaded synthetic discriminant functions (SDF) with filtered target scenery images that have been 2-D Fourier transformed, thereby producing a correlation surface. The correlation surface is, then, analyzed by a general purpose processor that generates from it spatial coordinates of any target. The coordinates are, in turn, provided to the tracker and control mechanism of the missile seeker to enable a more direct impact with the target.

DESCRIPTION OF THE DRAWING

The single FIGURE is a diagram of the preferred embodiment of the invention.

DESCRIPTION OF THE PREFERRED EMBODIMENT

Turning now to the FIGURE wherein like numbers refer to like parts and the several components are coupled to each other via commonly available digital data buses, operation of the Automatic Target Recognition System 100 is explained. Firstly, the System is located in the missile seeker. Secondly, even though the following description addresses an instantaneous frame of a target scenery, the operation of the System occurs on a continuing basis on the continual stream of input digital data frames of the viewed scenery. Its operation begins when sensor 101 sends digital data of the viewed scenery to preprocessor 103. The preprocessor then performs convolution on the received data, thereby producing filtered image of the scenery. When necessary, the preprocessor also eliminates the DC value from subsequent filtered images.

The filtered image is then input to two-dimensional correlator 107 which at the same time receives the synthetic discriminant function (SDF) digital data from SDF memory module 105. (A SDF is a name given to a well-known class of linear matched filter encoding techniques, the first one of these actually to provide reasonable performance being called the minimum average correlation energy (MACE) SDF). The correlator, upon receiving the filtered image of the scenery, implements a two-dimensional fast Fourier transform on the image data and on the results thereof performs a complex multiplication with the synthetic discriminant function. An inverse two-dimensional fast Fourier transform then follows, resulting finally in a digital correlation surface. These operations may be performed using four Austek A41102-20p with a 40 Mhz. clock and associated memory. While the correlation surface is thusly being generated, normalizer 102 which is coupled to sensor 101 as well as correlator 107, statistics generator 104 and general purpose processor 109, all in parallel, receives the correlated surface from the correlator and the original digital image data from the sensor. The normalizer uses the original digital image data to perform normalization of the correlation surface. The correlated surface, now normalized, is thereafter input to statistics generator 104 where the normalized surface statistics are calculated to produce the mean and the standard deviation of the current surface amplitude which in turn are input to general purpose processor 109. Also, in the statistics generator, the coordinates of the regions of interest are determined. This is accomplished by making use of the correlation surface statistics. A threshold is then set based on several sigma values above the mean, using previous frame statistics since the current frame statistics are only now being computed. General purpose processor 109, then receives the statistical information from statistics generator 104 and the corrected correlation surface data from normalizer 102 and performs an analysis that consists of measuring the statistics at and around each coordinate which exceeds the correlation surface threshold. Any coordinates which exceed the threshold are then tabulated for further analysis using the discriminant function residing in the general purpose processor. The discriminant function evaluates the closeness of the particular SDF transformation of the object, which is the value provided in the correlation surface, to determine if the object is a target of interest and if so the classification of the target. This analysis results in a determination as to where a target, if any, is located in the sensed scenery and the classification of such a target. If a target is located, processor 109 further processes the surface and produces the spatial coordinates of the target. The spatial coordinates are then input to tracker 111 to be used for more direct impact with the target. Tracker 111 may have direct access to correlator 107 for continuous tracking functions to provide control and reference data after the target has been acquired and tracking is proceeding to achieve the optimum aimpoint selection and fratricide avoidance.

The Automatic Target Recognition System provides an advanced capability to allow target selection, rejection and prioritization in a stand-alone embedded missile seeker processor for both long-range, precision-guided missiles and for shorter-range submunition application.

Although a particular embodiment and form of this invention have been illustrated, it is apparent that various modifications and embodiments of the invention may be made by those skilled in the art without departing from the scope and spirit of the foregoing disclosure.

Accordingly, the scope of the invention should be limited only by the claims appended hereto.

We claim:

1. An automatic target recognition system to be used in conjunction with a missile seeker that has a sensor and a target tracker; said system comprising: a preprocessor coupled to receive from the sensor scenery image data and produce filtered images therefrom, a module containing therein a plurality of synthetic discriminant functions, a correlator coupled between said preprocessor and said module to receive the filtered images from said preprocessor and synthetic discriminant functions from said module and perform complex multiplication of said images with said functions to produce correlation surfaces, a normalizer, said normalizer being coupled between the sensor and said correlator to receive original scenery image data from the sensor and correlated surface data from said correlator and create therefrom a normalized correlation surface, and a general purpose processor, said processor being suitably coupled between said normalizer and the tracker to receive from said normalizer the normalized correlation surface and produce therefrom spatial coordinates of any target and transmit said coordinates to the tracker for more direct impact of the missile on the target.

2. An automatic target recognition system to be used in conjunction with a missile seeker that has a sensor and a target tracker; said system comprising: a preprocessor coupled to receive from the sensor scenery image data and produce filtered images therefrom, a module containing therein a plurality of synthetic discriminant functions, a correlator coupled between said preprocessor and said module to receive the filtered images from said preprocessor and synthetic discriminant functions from said module and perform complex multiplication of said images with said functions to produce correlation surfaces, a normalizer, said normalizer being coupled between the sensor and said correlator to receive original scenery image data from the sensor and correlated surface data from said correlator and create therefrom a normalized correlation surface, a statistics generator, said generator being coupled to said normalizer for receiving normalized correlation surface data from said normalizer and calculate therefrom surface statistics, and a general purpose processor, said processor being suitably coupled between said statistics generator and the tracker to receive from said generator the surface statistics and produce therefrom spatial coordinates of any target and transmit said coordinates to the tracker for more direct impact of the missile on the target.

3. A target recognition system as set forth in claim 2, wherein the tracker is further coupled to said correlator to enable continuous tracking of a potential target, thereby achieving optimum aimpoint selection and fratricide avoidance.

\* \* \* \* \*